US012676944B2

(12) United States Patent
Lukac

(10) Patent No.: US 12,676,944 B2
(45) Date of Patent: Jul. 7, 2026

(54) VIDEOCONFERENCE IMAGE ENHANCEMENT BASED ON SCENE MODELS

(71) Applicant: ADVANCED MICRO DEVICES, INC., Santa Clara, CA (US)

(72) Inventor: Rastislav Lukac, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/534,973

(22) Filed: Dec. 11, 2023

(65) Prior Publication Data

US 2025/0193339 A1 Jun. 12, 2025

(51) Int. Cl.

| | |
|---|---|
| *H04N 7/15* | (2006.01) |
| *G06T 5/50* | (2006.01) |
| *G06T 7/20* | (2017.01) |
| *G06T 7/30* | (2017.01) |
| *G06V 10/56* | (2022.01) |
| *G06V 10/60* | (2022.01) |

(52) U.S. Cl.
CPC ................. *H04N 7/15* (2013.01); *G06T 5/50* (2013.01); *G06T 7/20* (2013.01); *G06T 7/30* (2017.01); *G06V 10/56* (2022.01); *G06V 10/60* (2022.01); *G06T 2207/20221* (2013.01); *G06T 2207/30168* (2013.01); *G06T 2207/30201* (2013.01)

(58) Field of Classification Search
CPC ......... G02B 27/0172; G06T 3/60; G06T 5/50; G06T 5/92; G06T 7/0002; G06T 7/174; G06T 7/20; G06T 7/30; G06T 9/001; G06T 2207/20221; G06T 2207/30168; G06T 2207/32201; G06T 3/18; G06T 3/4046; G06T 11/60; G06V 10/56; G06V 10/60; G06V 10/763; G06V 20/35; G06V 20/41; G06V 40/16; G06V 10/464; G06V 20/05; G06V 20/30; G11B 27/031; H04N 7/147; H04N 7/15; H04N 13/271; H04N 21/44218; H04N 23/66; H04N 23/667; H04N 23/698; H04N 9/3188; H04N 19/577

See application file for complete search history.

(56) References Cited

U.S. PATENT DOCUMENTS

| | | | | |
|---|---|---|---|---|
| 7,203,356 | B2 * | 4/2007 | Gokturk | G06T 9/001 |
| | | | | 375/E7.085 |
| 8,405,706 | B2 * | 3/2013 | Zhang | H04N 21/44218 |
| | | | | 348/14.07 |
| 9,661,298 | B2 * | 5/2017 | Liu | H04N 13/271 |
| 9,767,387 | B2 * | 9/2017 | Chaki | G06V 10/70 |
| 9,942,518 | B1 * | 4/2018 | Tangeland | G06V 10/763 |
| 10,397,519 | B1 * | 8/2019 | Kurisaki-Sagberg | |
| | | | | H04N 7/147 |
| 10,510,149 | B2 * | 12/2019 | Cutu | G06T 7/174 |
| 10,701,394 | B1 * | 6/2020 | Caballero | H04N 19/577 |
| 10,970,552 | B2 * | 4/2021 | Leroy | G06V 20/05 |
| 11,238,285 | B2 * | 2/2022 | Leroy | G06V 20/35 |

(Continued)

*Primary Examiner* — Gerald Gauthier

(57) ABSTRACT

An imaging system improves image quality, such as during a videoconference, by adjusting one or more captured images based on a model of a scene, a conference participant's face or a combination thereof. The images are adjusted in response to identification of relatively poor ambient conditions for image capture. The imaging system, such as a videoconference system, is thus able to display relatively high-quality images even in relatively poor conditions for image capture.

20 Claims, 6 Drawing Sheets

(56)                 References Cited

U.S. PATENT DOCUMENTS

| | | | |
|---|---|---|---|
| 11,558,593 B2 * | 1/2023 | Caron | G06V 10/56 |
| 11,663,710 B2 * | 5/2023 | Matsuoka | G06T 5/50 |
| | | | 382/154 |
| 11,978,177 B2 * | 5/2024 | Tezaur | G06T 3/20 |
| 12,056,879 B2 * | 8/2024 | Bleyer | G06V 10/464 |
| 12,238,422 B2 * | 2/2025 | Limonov | G06T 3/4038 |
| 12,400,290 B2 * | 8/2025 | Ratcliff | G02B 27/0172 |
| 2003/0235341 A1 * | 12/2003 | Gokturk | G06T 9/001 |
| | | | 382/173 |
| 2011/0157396 A1 * | 6/2011 | Kotani | H04N 23/66 |
| | | | 348/222.1 |
| 2017/0041585 A1 * | 2/2017 | Liu | H04N 13/271 |
| 2017/0068840 A1 * | 3/2017 | Chaki | G06T 7/0002 |
| 2017/0262707 A1 * | 9/2017 | Zhao | G11B 27/031 |
| 2018/0150697 A1 * | 5/2018 | Guttmann | G06V 20/30 |
| 2018/0314886 A1 * | 11/2018 | McCubbrey | G06T 7/20 |
| 2019/0251684 A1 * | 8/2019 | Ko | G06T 3/18 |
| 2019/0281203 A1 * | 9/2019 | Guicquero | H04N 23/667 |
| 2020/0053330 A1 * | 2/2020 | Takahashi | H04N 9/3188 |
| 2020/0193664 A1 * | 6/2020 | Wakui | G06T 11/60 |
| 2021/0012454 A1 * | 1/2021 | Tezaur | G06T 3/60 |
| 2021/0250565 A1 * | 8/2021 | Caron | G06V 40/16 |
| 2021/0397843 A1 * | 12/2021 | Guttmann | G06V 20/41 |
| 2022/0108420 A1 * | 4/2022 | Ratcliff | G02B 27/0172 |
| 2023/0232110 A1 * | 7/2023 | Limonov | H04N 23/698 |
| 2023/0267583 A1 * | 8/2023 | Pranskevichus | G06T 3/4046 |
| | | | 382/157 |
| 2025/0193339 A1 * | 6/2025 | Lukac | G06V 10/60 |

* cited by examiner

IMAGE CAPTURING
DEVICE
100

300 →

| | EXAMPLE 1 | EXAMPLE 2 | EXAMPLE 3 | EXAMPLE 4 |
|---|---|---|---|---|
| | 340 | 341 | 342 | 343 |
| IMAGE/VIDEO IN USER PROFILE (UP) | LOW QUALITY | HIGH QUALITY | HIGH QUALITY | LOW QUALITY |
| IMAGE/VIDEO IN VIDEOCONFERENCE (VC) | HIGH QUALITY | LOW QUALITY | HIGH QUALITY | LOW QUALITY |
| MODEL STORED FOR FUTURE USE | IMAGE/VIDEO IN VC | IMAGE/VIDEO IN UP | MIX OF UP AND VC | MIX OF UP AND VC |
| MODEL USED | NOT USED | IMAGE/VIDEO IN UP | NOT USED | MIX OF UP AND VC |

RECEIVE IMAGE/VIDEO DATA
110

402 — PERFORM AESTHETIC ANALYSIS

404 — GENERATE SCENE MODEL

406 — PERFORM SECURE ANALYSIS

408 — PERFORM GEOMETRIC / STRUCTURAL ALIGNMENT

410 — PERFORM PHOTOMETRIC ALIGNMENT

412 — PERFORM SCENE EDITING

414 — PERFORM POSTPROCESSING / APPLY APPEARANCE FILTERS

PROVIDE OUTPUT IMAGE/VIDEO
114

500

RECEIVE
IMAGE/VIDEO
DATA
110

502 — PERFORM SEGMENTATION / FEATURE EXTRACTION

504 — PERFORM SCENE MODEL EXTRACTION

506 — PERFORM NORMALIZATION / ALIGNMENT

508 — PERFORM ENHANCEMENT

510 — PERFORM MODEL MERGING

GENERATE
FACE/SCENE
MODEL
112

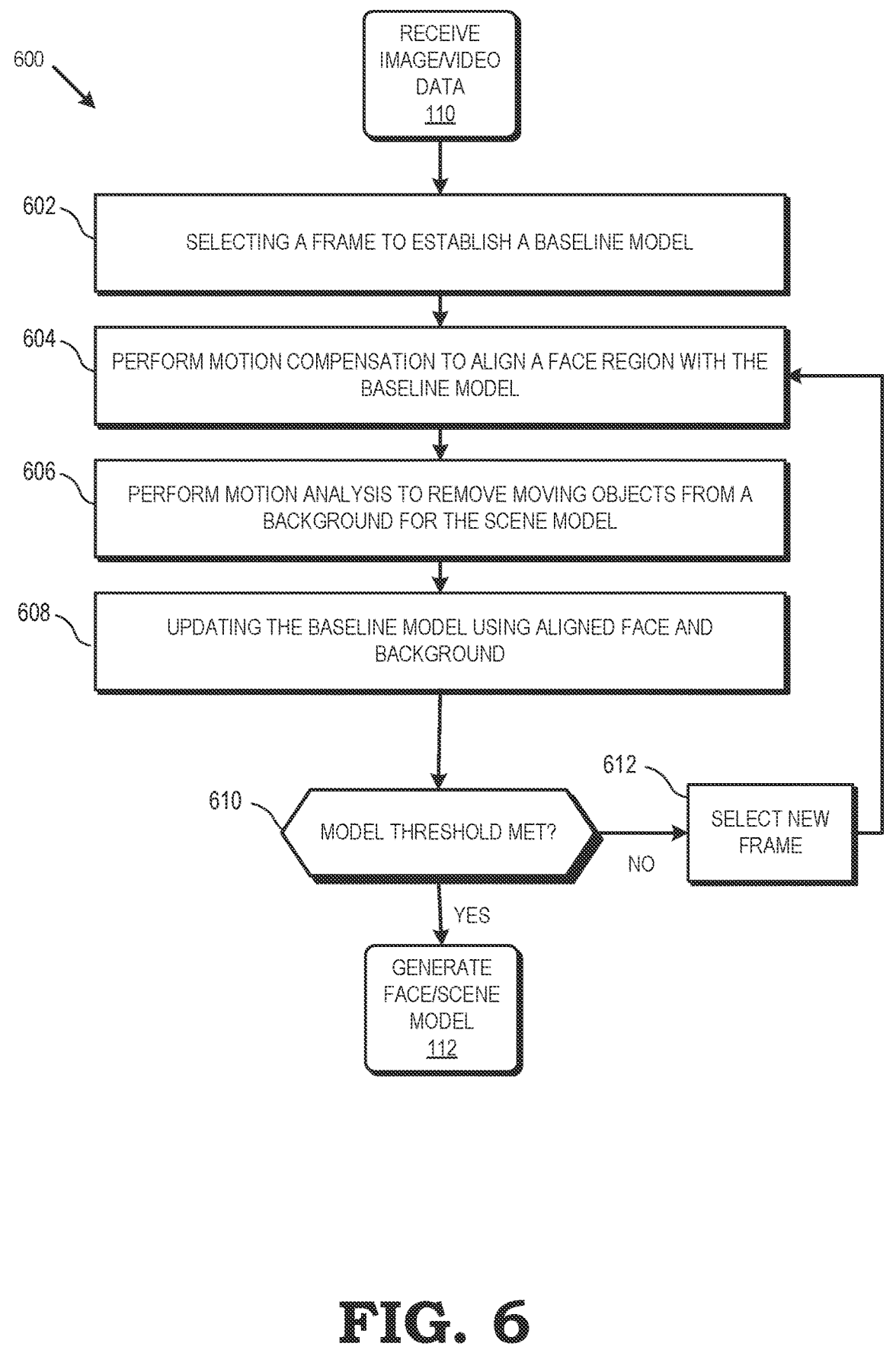

600

```
┌──────────────────┐
│     RECEIVE      │
│   IMAGE/VIDEO    │
│      DATA        │
│      110         │
└──────────────────┘
          │
          ▼
```

602 ─┐
┌────────────────────────────────────────────────────────┐
│       SELECTING A FRAME TO ESTABLISH A BASELINE MODEL     │
└────────────────────────────────────────────────────────┘
          │
          ▼

604 ─┐
┌────────────────────────────────────────────────────────┐
│  PERFORM MOTION COMPENSATION TO ALIGN A FACE REGION WITH THE │
│                    BASELINE MODEL                         │
└────────────────────────────────────────────────────────┘
          │
          ▼

606 ─┐
┌────────────────────────────────────────────────────────┐
│  PERFORM MOTION ANALYSIS TO REMOVE MOVING OBJECTS FROM A  │
│            BACKGROUND FOR THE SCENE MODEL                 │
└────────────────────────────────────────────────────────┘
          │
          ▼

608 ─┐
┌────────────────────────────────────────────────────────┐
│    UPDATING THE BASELINE MODEL USING ALIGNED FACE AND     │
│                     BACKGROUND                            │
└────────────────────────────────────────────────────────┘
          │
          ▼

612 ─┐
610 ─┐                                            ┌──────────────┐
  ⟨ MODEL THRESHOLD MET? ⟩ ──── NO ──────────────▶│  SELECT NEW  │
          │                                        │    FRAME     │
          │ YES                                    └──────────────┘
          ▼
┌──────────────────┐
│    GENERATE      │
│   FACE/SCENE     │
│     MODEL        │
│      112         │
└──────────────────┘
```

FIG. 6

VIDEOCONFERENCE IMAGE ENHANCEMENT BASED ON SCENE MODELS

BACKGROUND

Videoconferencing is an application enabling a face-to-face meeting between a group of people over a computer network. Each participant in the videoconference interfaces with the other participants via a computer device, with the computer device including a camera to capture images of the corresponding user, a microphone to capture audio (e.g., voice) for the user, and a display and speakers to present visual and audio data captured by the computer devices participating in the videoconference call. To produce a satisfactory videoconferencing experience, it is desirable for the cameras to capture relatively high-quality images of the corresponding user, as well as the surrounding environment. However, in at least some cases a videoconferencing device is in an environment, such as a low-light conditions, which makes capturing high-quality images or video difficult for a conventional computer device. Image quality for these environments can be improved using special lighting devices and setups, but these solutions are typically expensive, and furthermore reduce the flexibility and portability of at least some videoconferencing applications.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

FIG. 3 is a diagram illustrating different examples of the image capturing device of FIG. 1 selecting between scene models based on an identified image quality in accordance with some embodiments.

FIG. 6 is a flow diagram illustrating an example method for establishing and refining a baseline model in accordance with some embodiments.

DETAILED DESCRIPTION

Figure 1:
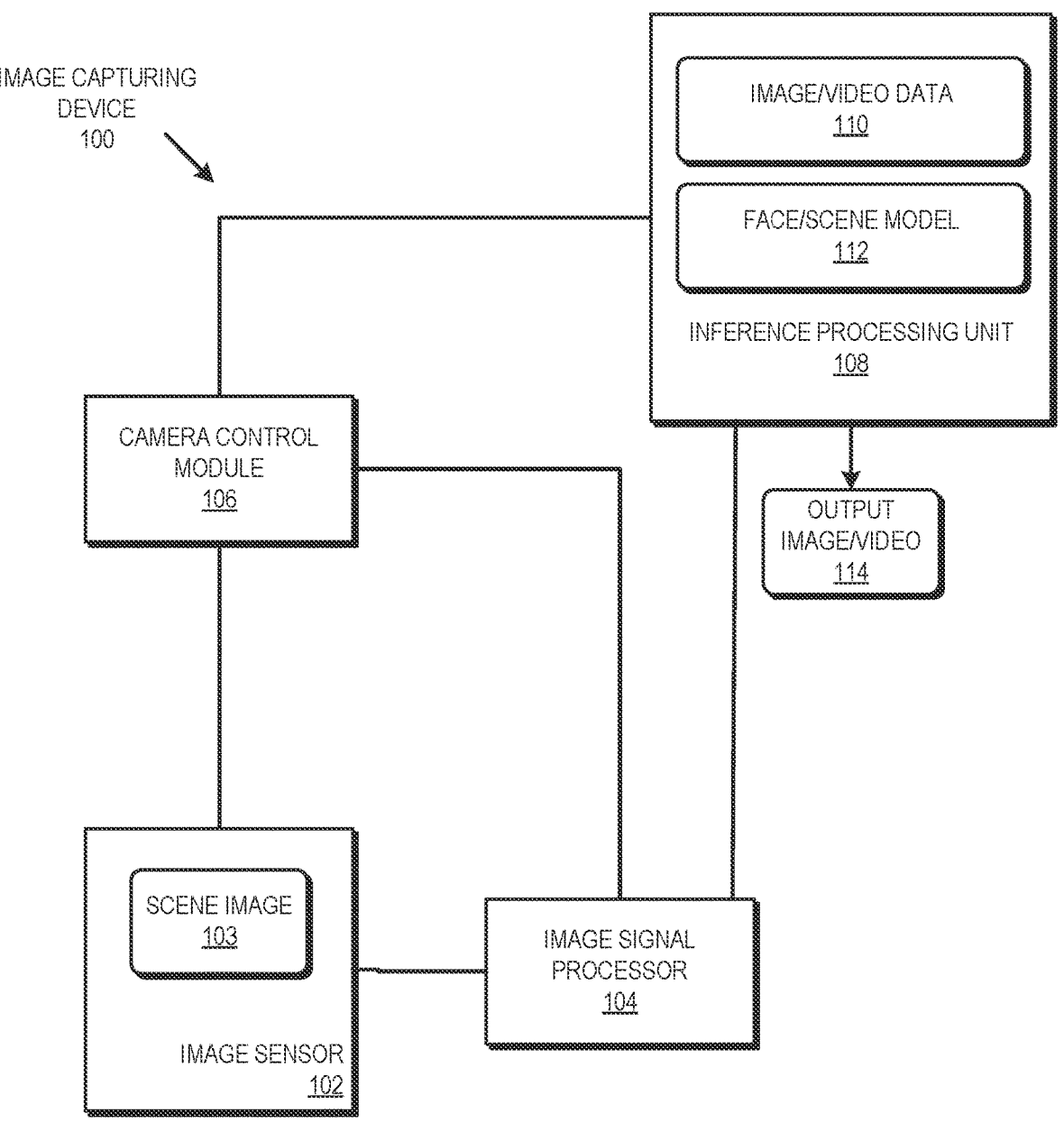
FIG. 1 is a block diagram of an image capturing device that generates face and scene models for integration with an image captured during videoconferencing to perform enhancement in accordance with some embodiments.

FIGS. 1-6 illustrate techniques and systems for improving image quality, such as during a videoconference, by adjusting one or more captured images based on a model of a scene, a conference participant's face, and the like, or a combination thereof. The images are adjusted in response to, for example, identification of relatively poor ambient conditions for image capture, such as low-light or backlight conditions. An imaging system, such as a videoconference system, is thus able to display relatively high-quality images even in relatively poor conditions for image capture.

To illustrate via an example, in some embodiments, a videoconference system connects at least two participating locations for the purpose of videoconferencing (i.e., video call or mutual video streaming). The system is configured to capture images, at each location, of conference participants (and the surrounding environments, or scenes) via one or more image capturing devices (e.g., one or more cameras). The system then transmits the images from each participating source location to all destination or receiving locations, and a display device at each location displays the images from participating locations, including the receiving user's location. However, in some cases, one or more of the locations can experience poor lighting conditions. The poor lighting conditions have an adverse effect on the quality and aesthetic appearance of the images captured by the videoconference system, resulting in inaccuracies in how the face of the corresponding user or the surrounding scene appears to the user and/or the other participants of the videoconference. Accordingly, to improve the quality of the displayed images, the videoconferencing system is configured to generate a model of the user, the scene, or a combination thereof based on images captured under relatively good image capturing conditions or over a time span necessary for collecting the desired information content and quality. In response to detecting poor image capturing conditions, such as low-light and backlight conditions, the videoconferencing system enhances the captured images using the scene model, thereby improving the quality of the displayed images, and thus improving the overall videoconferencing experience.

For example, in some embodiments the videoconferencing system is configured to perform an aesthetic analysis based on the captured image, such as by performing one or more of foreground/background decomposition, face detection and recognition, brightness, color, and contrast analysis, and noise and sharpness evaluation. The videoconferencing system compares the results of the aesthetic analysis to one or more image quality thresholds to detect one or more low-quality regions of a captured image. The videoconferencing system retrieves one or more scene models associated with the low-quality regions and aligns each model with the corresponding region of the captured image, so that the model matches the scale, orientation, and other features of the corresponding region. The videoconferencing system then performs photometric alignment with each model to produce the proper brightness, color, and contrast characteristics.

The videoconferencing system then blends each adjusted model with the corresponding portion of the captured image. In some embodiments, the videoconferencing system uses a parametrized function to control the range of scene enhancement from no blending at one end of the range through completely replacing the image content at the other end, wherein the level of blending depends on user settings, a scene model confidence map, or a combination thereof. In different embodiments, the blending is performed directly on the input image, or alternatively is performed in a transformed domain obtained through color space conversion, luminance-chrominance decomposition, frequency decomposition, and the like. After blending, the videoconferencing system performs postprocessing, including applying one or more appearance filters, such as skin smoothing and face/eye beautification in the case of human subjects, and noise adders, edge and texture enhancers, dithering, background blur, and lighting effects to further refine the overall image quality.

3

In some embodiments, the videoconferencing system generates the model based on images captured earlier in a conference session. To illustrate, each participant may encounter varying degrees of image capturing conditions during videoconferencing. For example, each participant may move around a room, shift in a seat, or be exposed to changes in ambient lighting. For at least these reasons, the quality of the images captured during a given videoconference generally changes. In some embodiments, in response to identifying that the image capturing conditions at a conference location are relatively good, the videoconference system uses recently captured images of a user or scene to generate a corresponding model of the scene. In response to determining that the conditions for the corresponding user or scene have fallen below a quality threshold, the videoconferencing system uses the model to adjust captured images later in the same conferencing session, thereby maintaining at least a minimum acceptable image quality for the videoconferencing session.

In some embodiments, the videoconferencing system implements one or more security features to protect the integrity of the videoconferencing event. For example, prior to adjusting the image, the videoconferencing system performs a secure analysis on the scene models, such as face recognition and authentication to ensure that a user identity remains unchanged. In some embodiments, the videoconferencing system also performs background scene verification.

Therefore, using dedicated image processing solutions to enhance the quality of captured images and video and ultimately produce a better user experience may be a more viable and cost-effective option.

FIG. 1 illustrates a block diagram of an image capturing device 100 that generates face and scene models for integration with an image captured during videoconferencing in accordance with some embodiments. The image capturing device 100 is a device that generally captures an image and/or a video. Accordingly, in different embodiments, the image capturing device 100 includes a camera, a desktop computer, a laptop computer, a smartphone, a tablet, a game console, and the like.

In some embodiments, the image capturing device 100 includes an image sensor 102, an image signal processor (ISP) 104, a camera control module (CCM) 106, and an inference processing unit (IPU) 108, but is not limited thereto. The image sensor 102 is a type of sensor used to capture a scene image 103 based on light waves passing through objects and/or reflecting off objects in the scene, which are converted into signals (i.e., data). Thus, in different embodiments, the image sensor 102 is a charge-coupled device (CCD) sensor, a complementary metal-oxide semiconductor (CMOS) sensor, and the like. The image sensor 102 is generally configured to capture an image in response to control signaling from the camera control module 106. For sake of brevity, reference to image in the description includes either an image (i.e., a static image) or a video (i.e., a moving image).

The ISP 104 and the IPU 108 are processing units, such as a media processor or digital signal processor that includes at least one processor core and supporting circuitry to execute computer instructions for image processing. In other words, the ISP 104 and the IPU 108 are collectively referred to as one or more processing units. Thus, in some embodiments, the image capturing device 100 includes additional processors than just the ISP 104 and/or the IPU 108. In some embodiments, the ISP 104 performs image signal processing operations such as noise reduction, sharpening, high

4 dynamic range (HDR) imaging, and tone mapping, as well as operations such as image quality analysis, image recognition, and correction, and application of calibration parameters, for instance, for black level and shading correction. In addition to operations implemented in hardware to achieve high processing rates, the ISP 104 performs various operations implemented in software and/or firmware, as well as on programmable processors, artificial intelligence (AI) accelerators, and the like for increased flexibility and performance of the camera. Similarly, the IPU 108 has its own software submodule to offload some operations from the hardware unit(s). Herein, the IPU 108 refers to any processor with AI capabilities.

The IPU 108 is a processing unit, such as a graphics processing unit (GPU), a neural processing unit (NPU), a vision processing unit (VPU), a field-programmable gate array (FPGA), an application-specific integrated circuit (ASIC), and the like, generally configured to execute image-based operations that are less suitable for processing by the ISP 104. For example, in some embodiments the IPU 108 is configured to perform computer vision operations, machine learning operations, artificial intelligence operations, and the like, in order to conduct image analysis and enhancement, as described further herein.

The CCM 106 is a module generally configured to control parameters of the image sensor 102 for image capture, typically using the statistics collected by the ISP from the scene image 103 or its partially processed version. In some embodiments, the ISP 106 and/or IPU 108 may be used to guide the decision-making process in the CCM 106 by providing additional information, such as the scene type, the location of faces in the image, and the like. Thus, in different embodiments, the CCM 106 controls aspects of the image sensor 102, such as automatic exposure control (AEC), automatic white balancing (AWB), automatic focus (AF), zoom, aspect ratio, orientation and the like. In at least some embodiments, the CCM 106 includes one or more sensors to detect one or more environmental conditions, such as ambient light, backlight, low light, and adjusts the parameters of the image sensor 102 based on data provided by the sensors. In some embodiments, the CCM 106 is software that includes at least one set of executable instructions stored or otherwise tangibly embodied on a non-transitory computer readable storage medium. In other embodiments, the CCM 106 is hardware circuitry configured to perform one or more of the above operations.

In some embodiments, the image capturing device 100 is part of a videoconferencing system, and in particular is configured to capture the image data (e.g., images, video, sequences of images), analyze the captured images for quality, adjust relatively low-quality images based on one or more models (e.g., face/scene model 112) to generate output images (e.g. output image 114), and to provide the output images to other portions of the system, such as the user's display device, and/or one or more remote display devices (not shown). The ISP 104 receives the scene image 103 (i.e., captured image) from the image sensor 102. Moreover, the ISP 104 recognizes and separates face and/or scene information from the captured image using one or more suitable methods. For example, the ISP 104 will use edge-detection, feature extraction, or other computer vision techniques to identify the presence of facial features in an image, and use a knowledge-based algorithm or a trained model that detects or recognizes a face based on the presence of these facial features (e.g., a nose, eyes, and mouth) within a threshold distance. Alternatively, the ISP 104 may use a feature-based algorithm to locate a face through extraction of structural features of the face and differentiate the facial regions from non-facial regions of the scene image 103. In other embodiments, the ISP 104 applies a template matching algorithm that includes preconfigured face templates to detect faces based on correlation between features in the scene image 103 and the preconfigured face templates. Any portions of the scene image 103 not identified by the ISP 104 as being part of the face will be identified as part of the scene.

Additionally, the ISP 104 analyzes the quality of the scene image 103. In some embodiments, the ISP 104 analyzes the quality of the raw image data captured by the sensor 102. In some other embodiments, the images partially or completely processed by the ISP 104 undergo image quality analysis. In some embodiments, the ISP 104 analyzes the image quality based on an identified brightness, skin tone on a face of the user, appearance of the scene surrounding the user, and any combination thereof. The ISP 104 will identify the image quality prior to being sent to the IPU 108 for further processing. Subsequently, the ISP 104 will send the face and/or scene information and image quality information to the IPU 108. In some embodiments, the image quality is analyzed by the IPU 108, for instance, using the trained model or some other suitable method, based on some design and implementation strategies, power consumption targets, combination of components, etc.

After the IPU 108 receives the image with face and/or scene information from the ISP 104, the IPU 108 generates a face model and/or a scene model 112 based on the image/video data 110. In some embodiments, the image video/data 110 includes the scene image 103 in the form of raw image data captured by the sensor 102. In some other embodiments, the IPU operates on the scene image 103 partially or completely processed by the ISP 104. Specifically, the IPU 108 generates the face model and/or the scene model 112 during suitable image capture conditions, such as good ambient lighting, as opposed to less suitable image capture conditions, such as poor ambient lighting. The IPU 108 generates the face model and/or the scene model 112 based on at least one source of image/video data. For example, in some embodiments, the IPU 108 has the face model and/or the scene model 112 stored within a memory unit 108-1 based on preconfigured setting in a user profile. Alternatively, the IPU 108 generates the face model and/or the scene model 112 during good quality image capture conditions, which during a videoconference, includes images received during an earlier conference session. In some embodiments, the IPU 108 overcomes less suitable image capture conditions by using more frames in a sequence of frames and/or spending time over a time threshold (e.g., longer time) to generate the desired quality models, as opposed to using fewer image frames or shorter time to produce the model in good lighting conditions. In other embodiments, the model itself can undergo quality enhancement (e.g., via temporal merging, super-resolution, 3D reconstruction, etc.) before being used to enhance the captured images for videoconferencing.

Furthermore, similar to the ISP 104 in some other embodiments, the IPU 108 recognizes and separates face and/or scene information from the captured image, which includes the image/video data 110, using one or more suitable methods. For example, the IPU 108 uses edge-detection, feature extraction, or other computer vision techniques to identify the presence of facial features in an image, and use a knowledge-based algorithm or a trained model that detects or recognizes a face based on the presence of these facial features (e.g., a nose, eyes, and mouth) within a threshold distance. Alternatively, the IPU 108 may use a feature-based algorithm to locate a face through extraction of structural features of the face and differentiate the facial regions from non-facial regions of the image scene 111. In other embodiments, the IPU 108 applies a template matching algorithm that includes preconfigured face templates to detect faces based on correlation between features in the image scene 111 and the preconfigured face templates. Any portions of the image not identified by the IPU 108 as being part of the face will be identified as part of the scene.

Specifically, the face/scene model is created using the image/video data 110. To establish a baseline model, an image (frame) from the sequence of frames is selected. In some embodiments, this image represents a key frame, a frame with the converged sensor 102 and ISP 104 settings for a given scene, or otherwise chosen frame. The subsequent frames are subject to motion compensation to align the face region in the image (i.e., foreground) with the baseline face model and motion analysis to remove moving objects in image background for the scene model. In other embodiments, the image/video data 110 is subject to image registration, 3D face reconstruction, and the like. The aligned foreground and background content can be combined with the baseline face/scene model via per-pixel blending, temporal averaging, object merging, and the like, thus updating the baseline model for each new frame. This process can be guided by an adaptive similarity function of the baseline frame and the aligned frame to determine the optimal weights or mixing coefficients to perform blending per pixel, per object, and/or entire frame. Unless the scene dramatically changes in a very short period, this iterative process accumulates sufficient information content over time to produce a high-quality/high-fidelity face/scene model for enhancement and/or storage. For instance, temporal averaging reduces noise and preserve the details in the image. Similarly, having many similar images helps restore scene background around or behind the moving user and enhance the resolution of the face/scene model. It should be noted, however, that if the degree of the scene change exceeds a threshold or the model quality does not satisfy some other predetermined criteria, the model creation process is restarted in some embodiments by selecting a new frame to establish a new baseline model.

During the videoconference, situations arise that cause the ISP 104 to identify poor image capture conditions due to changes in lighting or movement of the user in the image 110. Accordingly, the ISP 104 will send updated image quality information to the IPU 108 in response to the ISP 104 determining the image 110 is high quality or poor quality. Subsequently, the IPU 108 will integrate the face model and/or the scene model 112 with the image 110 to increase the quality of the output image/video 114 in response to the IPU 108 receiving information of poor image capture conditions from the ISP 104. In particular, the IPU 108 changes the captured image by blending portions of the face model and/or the scene model 112 with the image 110. Alternatively, the IPU 108 applies changes to the captured image in a transformed domain (e.g., a temporary memory space, virtual memory) obtained through color space conversion, luminance-chrominance decomposition, and frequency decomposition. Accordingly, the IPU 108 will generate an output image 114 which is a combination of the image 110 and the face model and/or the scene model 112.

Figure 2:
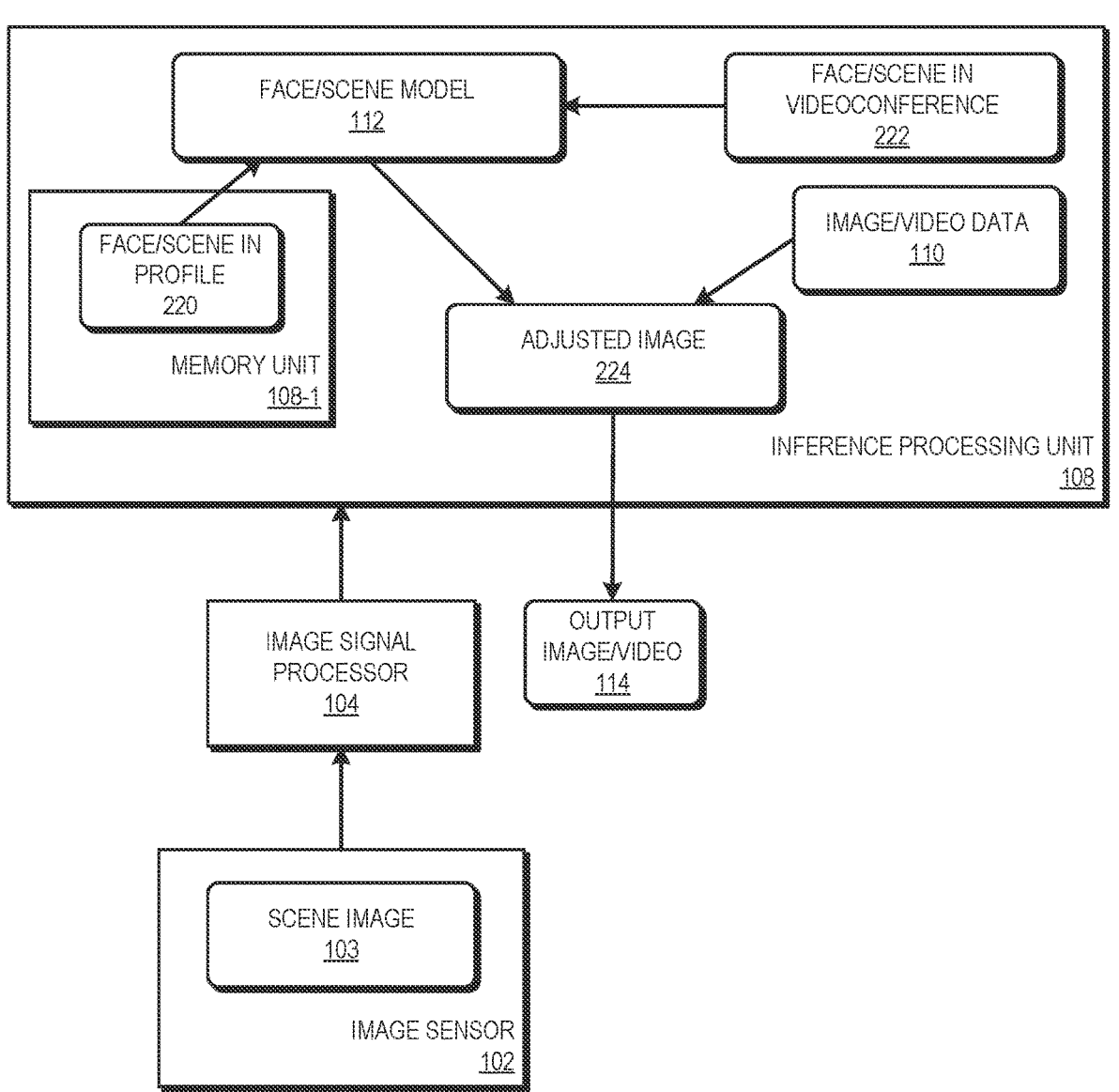
FIG. 2 is a block diagram illustrating an example of the image capturing device of FIG. 1 integrating a first scene model in a user profile or a second scene model with a captured image during a videoconference in accordance with some embodiments.

FIG. 2 illustrates a block diagram of an example of the image capturing device 100 integrating a first scene model in a user profile or a second scene model based on another captured image during a videoconference in accordance with some embodiments. The IPU 108 generates a face model and/or a scene model 112 in response to receiving the image 110 from the ISP 104. The IPU 108 generates the face model and/or the scene model 112 by extracting facial landmarks, edges, corners, and other suitable features for registering multiple frames of the same scene to produce high-quality models. In other embodiments, the IPU 108 employs trained models to take advantage of AI acceleration for specific tasks to generate the face model and/or the scene model 112 including face and/or scene adjustment based on the image quality in a computationally efficient way. Generally, the IPU 108 will learn facial features and/or background information to increase the speed of generating the face model and/or the scene model 112 through the AI acceleration. Moreover, the IPU 108 identifies whether to use a first scene model or a second scene model based on the image quality information received from the ISP 104.

Additionally, the IPU 108 retrieves a face and/or a scene 220 (a.k.a., a first scene model 220) as stored in a user profile in the memory unit 108-1 coupled to or integrated with the IPU 108 to generate the face model and/or the scene model 112 using the image/video data 110. In other words, the face and/or the scene 220 include the face and/or the scene information identified from the image 110. Examples of suitable memory unit options include random-access memory (RAM), flash memory, magnetic disk storage device, optical disk storage device, cache, and the like. In some embodiments, the face and/or the scene 220 is the face and/or scene information previously processed by the ISP 104. Alternatively, the memory unit 108-1 stores the pre-calculated face and scene models rather than the source images for model generation. In other embodiments, the face and/or the scene 220 is based on the face and/or the scene information provided by the user during an initialization process. Thus, in some embodiments the face model and/or the scene model 112 is based on the face of the user and/or the scene around the user, respectively, that was prerecorded and stored in the user profile during the initialization process and predetermined by the ISP 104 and/or the IPU 108 as having high image quality. Alternatively, the face model and/or the scene model 112 is selected by the user as having high image quality during initialization.

Alternatively, in other embodiments, the IPU 108 generates the face model and/or the scene model 112 using a face and/or a scene 222 (a.k.a., a second scene model) from the images captured during a videoconference. For example, the ISP 104 determines the image 110 satisfies some predetermined image quality criteria, such as a threshold scene condition to compare whether scene brightness (e.g., illumination) is equivalent to a brightness threshold which will lead to accurate representation of the face and/or the scene 222. In other words, the image 110 is poor quality, when the identified brightness exceeds the brightness threshold (i.e., too bright) or is below the darkness threshold (i.e., too dark) which make the face and/or the scene 222 have improper brightness, colors and tone (contrast), level of details, signal-to-noise (SNR) ratio, and the like.

In some embodiments, the ISP 104 identifies image quality based on distance (i.e., shooting distance) of the user from the image sensor 102, which can reduce the quality and size of the face of the user. The image sensor 102 is often limited in ability to accurately the scene, including the user and objects in the scene, based on the distance from a target. For example, generally, the objects in the image 110 will appear less sharp and carry less details when they are farther from the image sensor 102, while being closer to the camera will improve object quality. Additionally, the IPU 108 generates the face model and/or the scene model 112 based on the image 110 with the identified image quality. As described above, the identified image quality is based on the threshold scene condition determined by the ISP 104. Alternatively, in some embodiments, the IPU 108 determines whether the scene threshold condition is met. In either case, the IPU 108 will generate the face model and/or the scene model 112 in response to the image 110 having the identified image quality. Accordingly, the IPU 108 updates the face model and/or the scene model 112 with the face and/or the scene 222 from the image 110 in response to the image 110 having a higher image quality than the previously used face model and/or previously used scene model. However, in situations where the previously used face model and/or the previously used scene model has higher image quality, the previously used face model and/or the previously used scene model is kept. It is important to note that the previously used face model and/or the previously used scene model refers to a face model and/or a scene model that is stored in the user profile prior to being updated by the IPU 108.

Therefore, whether the IPU 108 generates the face model and/or the scene model 112 by retrieving it from the user profile or from image capture during the videoconference event, the face model and/or the scene model 112 is based on a first captured image. Stated differently, the first captured image is the image 110 that has been determined by the ISP 104 to have the identified image quality (e.g., not too bright, not too dark, proper colors) and is used by the IPU 108 to generate the face model and/or the scene model 112 unless the previously used face model and/or the previously used scene model has a higher image quality. Accordingly, the face model and/or the scene model 112 is combined with the image 110 to create an adjusted image 224. The adjusted image 224 will be a high-quality image that is displayed during the videoconference event and is output as the output image 114.

Subsequently, in some cases, during the videoconference event or another videoconference event, the ISP 104 determines another image 110 (i.e., a second captured image) does not satisfy the identified image quality as described above and/or the identified brightness exceeds or falls below the brightness threshold (e.g., too bright, too dark, backlight saturation). In this instance, the second captured image meets the threshold scene condition, which in some embodiments includes being too dark, too bright, having improper colors, having poor contrast, and the like, such that the ISP 104 identifies another image 110 as having poor image quality. As such, the IPU 108 integrates another image 110 with the face model and/or the scene model 112 as the adjusted image 224, such as using blending and/or replacing at least a portion of another image 110 as described above. As a result, the IPU 108 sends the adjusted image 224 as the output image 114. This process is repeated for all frames which do not meet the identified image quality. Accordingly, the output image 114 represents a high-quality image for each frame of the image 110 (i.e., each frame of video in the videoconference event) which does not satisfy the identified image quality.

Although the description has described specific components as performing certain steps, such as the ISP 104 and/or the IPU 108, the steps are considered as an example. In other words, the ISP 104 and/or the IPU 108 could be used interchangeable to perform all the aforementioned processes. Furthermore, it will be appreciated that the image capturing device 100 could be used to describe all of the aforementioned processes.

FIG. 3 illustrates a table 300 depicting examples of the image capturing device 100 selecting between the first scene model and the second scene model of FIG. 2 based on the identified image quality in accordance with some embodiments. The table 300 includes five columns, with a first column indicating a row title setting forth the conditions of a corresponding example and the remaining columns, designated columns 340-343, indicating results corresponding to several examples, designated examples 1-4, of the ISP 104 determining the identified image quality based on the face and/or the scene 220 and the face and/or the scene 222. Additionally, the table 300 includes five rows, with a top row indicating the example number, and the remaining four rows, designated rows 333-336, corresponding to different results based on selection between the first scene model and the second scene model. Specifically, row 333 identifies the face model and/or the scene model 112 as stored in the user profile. On the other hand, row 334 identifies the face model and/or the scene model 112 as generated during the videoconference event. Row 335 indicates which model is stored in the user profile for future use based on determination by the ISP 104 of the identified image quality. The row 336 indicates which model will be used.

In example 1, at column 340, the face and/or the scene 220 in the user profile is retrieved by the IPU 108 and sent to the ISP 104. The ISP 104 also receives the image 110 during the videoconference event and identifies the face and/or the scene 222 from the image 110. The ISP 104 analyzes and compares the face and/or the scene 220 to the face and/or the scene 222 based on the identified image quality. In the case of example 1, the ISP 104 determines the face and/or the scene 222 has a higher image quality. Accordingly, the ISP 104 sends the result to the IPU 108. The IPU 108 generates the face model and/or the scene model 112 based on the face and/or the scene 222 in response to receiving the result from the ISP 104. Furthermore, the IPU 108 stores the face and/or the scene 222 as the face model and/or the scene model 112 for future use, such that the face and/or the scene 220 is replaced, or in some embodiments enhanced, with the face and/or the scene 222. It should be understood that although the ISP 104 determines the face and/or the scene 220 as having low quality, it is a determination of degree with respect to the face and/or the scene 222. In other words, in this example, the face and/or the scene 222 has a higher quality than the face and/or the scene 220 rather than the face and/or the scene 220 falling outside the identified image quality or the brightness threshold. Since the image/video data 110 has a high image quality in this example, the model is not used for the integration with the image/video data 110 to produce the output image 114.

With respect to example 2, at column 341, the face and/or the scene 220 in the user profile is retrieved by the IPU 108 and sent to the ISP 104. The ISP 104 also receives the image 110 during the videoconference event and identifies the face and/or the scene 222 from the image 110. The ISP 104 analyzes and compares the face and/or the scene 220 to the face and/or the scene 222 based on the identified image quality. In the case of example 2, the ISP 104 determines the face and/or the scene 220 has a higher image quality. Accordingly, the ISP 104 sends the result to the IPU 108. The IPU 108 generates the face model and/or the scene model 112 based on the face and/or the scene 220 in response to receiving the result from the ISP 104. Furthermore, unlike in example 1, the IPU 108 continues to use the face and/or the scene 220 as the face model and/or the scene model 112 in future use. If the image/video data 110 does not satisfy the identified image quality for the videoconference output, the IPU 108 sends the image 110 combined with or otherwise enhanced using the face model and/or the scene model 112 as the output image 114.

With respect to example 3, at column 342, the face and/or the scene 220 in the user profile is retrieved by the IPU 108 and sent to the ISP 104. The ISP 104 also receives the image 110 during the videoconference event and identifies the face and/or the scene 222 from the image 110. The ISP 104 analyzes and compares the face and/or the scene 220 to the face and/or the scene 222 based on the identified image quality. In the case of example 3, the ISP 104 determines the face and/or the scene 220 and the face and/or the scene 222 have equally high image quality. Accordingly, the ISP 104 sends the result to the IPU 108. The IPU 108 generates the face model and/or the scene model 112 based on the face and/or the scene 220, and/or the face and/or the scene 222 in response to receiving the result from the ISP 104. In other words, the IPU 108 uses either the face model and/or the scene model 112, use the best features of either, or combine each into the face model and/or the scene model 112. Furthermore, the IPU 108 stores either the face and/or the scene 220, the face and/or the scene 222, or a combination of each as the face model and/or the scene model 112 in future use, such that either the face and/or the scene 220, the face and/or the scene 222, or a combination of each replaces the face and/or the scene 220. Since the image/video data 110 has a high image quality in this example, the model is not used for the integration with the image/video data 110 to produce the output image 114.

With respect to example 4, at column 343, the face and/or the scene 220 in the user profile is retrieved by the IPU 108 and sent to the ISP 104. The ISP 104 also receives the image 110 during the videoconference event and identifies the face and/or the scene 222 from the image 110. The ISP 104 analyzes and compares the face and/or the scene 220 to the face and/or the scene 222 based on the identified image quality. In the case of example 4, the ISP 104 determines the face and/or the scene 220 and the face and/or the scene 222 have equally low image quality. Accordingly, the ISP 104 sends the result to the IPU 108. The IPU 108 generates the face model and/or the scene model 112 based on the face and/or the scene 220 in response to receiving the result from the ISP 104. In other words, the IPU 108 uses either the face model and/or the scene model 112, use the best features of either, or combine each into the face model and/or the scene model 112. Furthermore, the IPU 108 stores either the face and/or the scene 220, the face and/or the scene 222, or a combination of each as the face model and/or the scene model 112 in future use, such that either the face and/or the scene 220, the face and/or the scene 222, or a combination of each replaces the face and/or the scene 220. If the image/video data 110 does not satisfy the identified image quality for the videoconference output, the IPU 108 sends the image 110 combined with or otherwise enhanced using the face model and/or the scene model 112 as the output image 114.

Alternatively, with respect to example 4, by default the ISP 104 determines the face and/or the scene 220 has a higher image quality than the face/scene model 222. Thus, a subsequent determination by the ISP 104 of the identified image quality during analysis of the image 110 does not affect generation of the face model and/or the scene model 112 by the IPU 108 unless a scenario as in example 1 occurs. Accordingly, the ISP 104 sends the result to the IPU 108. The IPU 108 generates the face model and/or the scene model 112 based on the face and/or the scene 220 in response to receiving the result from the ISP 104. Furthermore, the IPU 108 continues to use the face and/or the scene 220 as the face model and/or the scene model 112 in future use. If the image/video data 110 does not satisfy the identified image quality for the videoconference output, the IPU 108 sends the image 110 combined with or otherwise enhanced using the face model and/or the scene model 112 as the output image 114. Alternatively, in some embodiments, with respect to examples 1 and 3, the image/video data 110 is combined with or otherwise enhanced using the face model and/or the scene model 112 to generate the output image 114 regardless of the image 110 having a high quality. Finally, with respect to examples 1-4, it should be noted that in some embodiments, depending on the design and implementation strategies, the face and/or the scene 220 in the user profile retrieved by the IPU 108 will not be sent to the ISP 104 if the associated information on image quality can be retrieved from the user profile. In some other embodiments, the IPU 108 analyzes and compares the face and/or the scene 220 to the face and/or the scene 222 based on the identified image quality. In yet another embodiment, the face and/or the scene 220 is enhanced with the face and/or the scene 222 instead of replacing the face and/or the scene 220 with the face and/or the scene 222.

Figure 4:
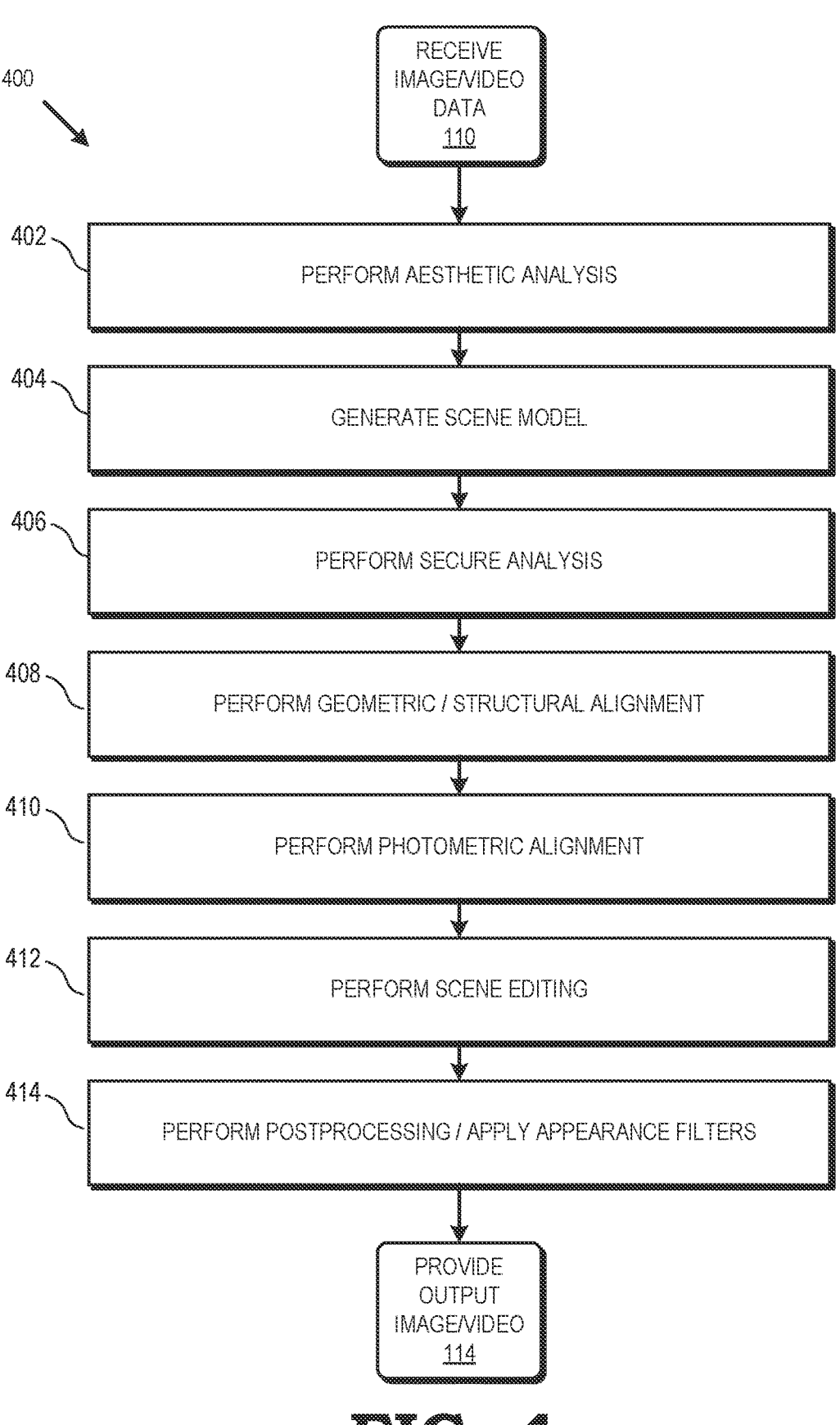
FIG. 4 is a flow diagram illustrating a method for improving image quality during a videoconference in accordance with some embodiments.

FIG. 4 illustrates a flow diagram depicting a method 400 for improving image quality using an image capturing device during a videoconference in accordance with some embodiments. The method 400 is described with respect to an example implementation of the image capturing device 100 of FIG. 1. At block 402, the image/video data 110 is subject to aesthetic analysis. Specifically, in some embodiments, the ISP 104 performs image quality and aesthetic analysis which involves foreground/background decomposition, face analysis, brightness, color, and contrast analysis, and noise and sharpness evaluation, and the like. The result of the aesthetic analysis is compared to one or more image quality thresholds to detect one or more low-quality regions of the image/video data 110. Furthermore, in other embodiments, the IPU 108 leverages AI acceleration for dedicated manipulation of images and calculation of image properties, which involves learning facial features and/or background information to increase the speed of performing aesthetic analysis 402 and/or generating the face model and/or the scene model 112 as these tasks will be performed frequently during the videoconferencing event. In some other embodiments, each frame of the image/video data 110 is given the at least one confidence value as a test of quality of the image 110 based on an image comparison threshold. For example, in some embodiments the IPU 108 provides the at least one confidence value to the ISP 104 to facilitate determination of a rank of image quality. Also, the IPU 108 applies the at least one confidence value to a confidence map based on the image 110 to determine which portions of the image 110 require improvement of image quality. For example, the IPU 108 generates the confidence map that identifies image quality from regions of the image 110, individual pixels of the image 110, and/or layers of the image 110. Furthermore, the confidence map is updated and/or replaced as the image 110 received by the IPU 108 from the ISP 104 changes with updated determinations of the image quality.

At block 404, the IPU 108 generates the face model and/or the scene model 112 based on the image/video data 110. Further description of generation of the face model and/or the scene model 112 is provided with respect to FIG. 5 below.

At block 406, the image capturing device 100 performs secure analysis on the face model and/or the scene model 112 through the ISP 104 and/or the IPU 108 by applying face detection, face recognition/authentication, deepfake detection, and the like to ensure an identity of the user and/or the scene is verifiable integrity of the videoconference event is maintained when image enhancement is done, such as through scene editing 412 described below. Thus, the image 110 is integrated with the face model and/or the scene model 112 in response to verification of the identity of the user and/or the scene as authentic. Otherwise, a non-secure mode will be activated in response to failed verification of authenticity. In some embodiments, the non-secure mode includes warnings to other participants in the videoconference that the user has not been verified, blocking audio/video streaming, data transfer, information sharing, and otherwise limiting videoconference capabilities of unverified participants.

At block 408, the image capturing device 100 performs geometric alignment of the face model 112 to match scale, orientation, expression, and facial landmark locations of the face 222 extracted from the image 110. Additionally, the scene model 112 is geometrically aligned with the scene 222 extracted from the image 110. For example, the scene model 112 is geometrically aligned with any non-face objects and/or features in the background of the scene 222. Thus, geometric alignment ensures that all structural elements in the image 110 appear normal or match the original face and/or scene during presentation on a display device.

At block 410, the image capturing device 100 performs photometric alignment to produce any desired brightness, color, and contrast characteristics of the face model and/or the scene model 112. Therefore, the photometric alignment ensures appearance of the face model and/or the scene model is accurate, visually pleasing, or otherwise suitable to enhance image appearance and user experience. In some embodiments, photometric alignment is applied prior to integrating the image 110 with the face model and/or the scene model 112.

At block 412, the image capturing device 100 performs scene editing and/or image blending using a blend module. In some embodiments, the blending module includes software within the IPU 108 that includes at least one set of executable instructions stored or otherwise tangibly embodied on a non-transitory computer readable storage medium, such as the memory unit 108-1. Depending on parameters from the ISP 104 and employed design and implementation strategies, scene editing 412 is needed at all. For example, in some embodiments, scene editing would not be performed when the ISP 104 sends the face and/or the scene information that indicates the image 110 is of high quality. In some other embodiments, only aesthetic analysis 402 and scene model generation 404 would be executed when the image 110 satisfies the image quality requirements. However, the IPU 108 will perform scene editing, such as replacing or combining content in the image 110 with the face model and/or the scene model 112 in response to the ISP 104 identifying the image 110 is a poor-quality image. In some embodiments, the amount of replacement is based on the user settings, or the confidence map as described above, that requires, for example, total replacement of the image 110, regions of the image 110, the face of the user, or portions of the scene based on identification by the confidence map which areas of the image 110 satisfy the threshold scene condition (i.e., poor image quality). It should be noted that the confidence map is subject to change based on refinement of the face model and/or the scene model 112 during the videoconference event (e.g., subsequent higher quality image determinations to replace previous face and/or scene models). The IPU 108 applies scene editing directly on the image 110 itself and/or within separate area of memory designated for editing operations, including color space conversion, luminance-chrominance decomposition, and frequency decomposition. All these processes occur in the memory unit 108-1 prior to integration the face/scene models with the actual image 110 through blending. Furthermore, the IPU 108 activates the scene editing in response to manual activation by the user through adjustment of settings on the CCM 106, thus affecting the operation of the image sensor 102, the ISP 104, and the IPU 108.

Finally, at step 414, the image capturing device 100 performs postprocessing and applies any necessary filters desired by the user. For example, depending on settings in the CCM 106, the IPU 108 and/or the ISP 104 will apply skin filters, face and/or eye enhancements, edge and texture enhancement, noise adders, dithering, background blur, and color and lighting effects.

Figure 5:
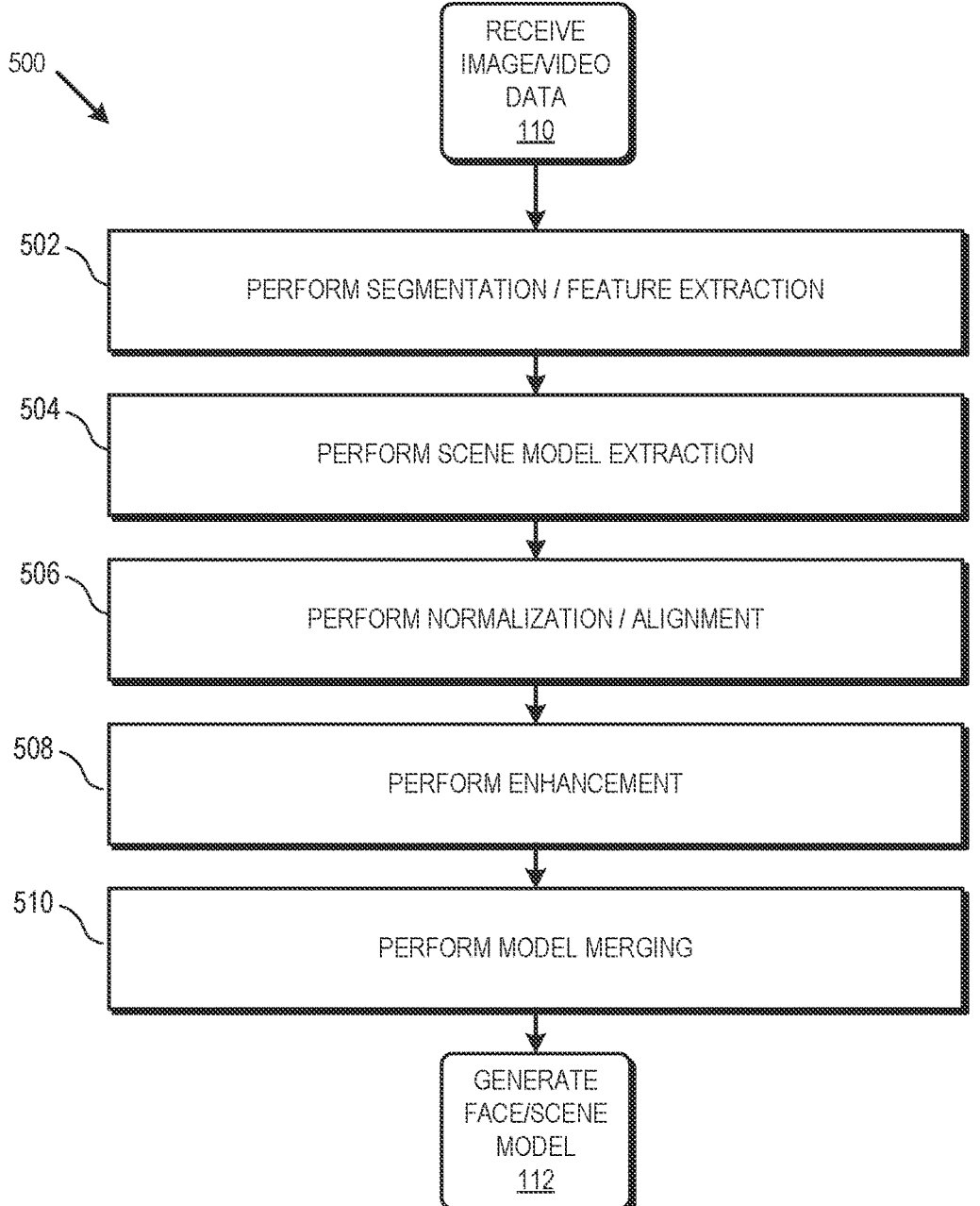
FIG. 5 is a flow diagram illustrating a method for generating a face/scene model in accordance with some embodiments.

FIG. 5 illustrates a flow diagram illustrating a method 500 for generating a face/scene model in accordance with some embodiments. As described above, the method 500 includes all steps for the generation of the face model and/or the scene model 112 at block 404. At block 502, the IPU 108 receives the face and/or the scene 222 with the image/video data 110 from the ISP 104. Alternatively, the IPU 108 retrieves the face and/or the scene 220 as stored in the memory unit 108-1. The IPU 108 performs segmentation and/or feature extraction to separate features in the image/video data 110. The IPU 108 uses image segmentation, computer vision, pattern recognition, object detection, semantic analysis, trained models, and/or other suitable techniques to extract the features to identify facial landmarks, edges, corners, and the like within the image/video data 110. In some embodiments, feature extraction and/or other steps of the method 500 is performed in software, for instance, using dedicated libraries. Alternatively, in other embodiments, the image segmentation/feature extraction process 502, the face model and/or the scene model 112, and/or the entire method 500 will leverage AI acceleration to achieve high processing rates. Depending on the design, implementation, and power consumption strategies, the method 500 is applied to each frame or just select frames (e.g., each 10th frame) within the image/video data 110.

At block 504, the face/scene model 112 is extracted. Specifically, this process will isolate any facial and non-facial features for potential use in the face/scene model 112, which includes the user's face, other human subjects present in the scene, non-face objects, and/or other features in the background.

At block 506, the method 500 performs normalization and alignment of the face model and/or the scene model 112. Specifically, this step adjusts range, scale, and/or orientation of the face model and/or the scene model 112 to facilitate and improve the accuracy of model merging 510 described below.

At block 508, the process continues with enhancement of the face model and/or the scene model 112 to further improve performance of model merging 510 described below. Specifically, the adjusted model from 506 is subject to temporal processing, event filtering, noise filtering, super-resolution enhancement, and the like. For example, temporal processing identifies and tracks moving portions of the image/video data 110 on a frame-to-frame basis. On the other hand, event filtering includes extraction of at least one representative frame (a.k.a. key frame) for each event sequence from the image/video data 110 to create a baseline for generation of the face model and/or the scene model 112. Finally, noise filtering aims at suppressing noise while preserving details and edges of the face/scene model, whereas super-resolution imaging enhances the resolution of the face/scene model to produce the best possible image quality and user experience.

Finally, at block 510, the method 500 completes with merging the face model and/or the scene model 112 of the image/video data 110 with the current face/scene model baseline. Thus, the face/scene model is updated in each iteration and/or frame to increase its accuracy and information contents until the scene changes so that a new baseline scene model will need to be created.

FIG. 6 illustrates a flow diagram of an example method 600 for establishing and refining a baseline model in accordance with some embodiments. At block 602, the image capturing device 100 receives the image 110. The image capturing device 100 selects a frame (i.e., an image) from a sequence of frames to establish a baseline model. In some embodiments, this image represents a key frame, a frame with the converged sensor 102 and the ISP 104 settings for a given scene, or otherwise chosen frame. Then, the image capturing device proceeds along the step of the method 500 to extract the desired features and perform model enhancement and merging. Specifically, at block 604, the image capturing device 100 performs motion compensation, image registration, image alignment and enhancement, and the like to align a face region in the image 110 of subsequent frames for the baseline face model. Moreover, at block 606, the image capturing device 100 applies motion analysis to align the background by remove moving objects from the background to create the scene model.

At block 608, the image capturing device 100 updates the baseline model with each frame from the sequence of frames. Specifically, the image capturing device 100 uses the aligned face region or the aligned background and combines them with the baseline model by per-pixel blending, temporal averaging, object-based merging, and the like. In some embodiments, this step is controlled by an adaptive similarity function of the baseline model and the aligned face region and/or the aligned background to determine optimal weights or mixing coefficients for combining the aligned face/background with the baseline model.

At block 610, the image capturing device 100 analyzes the baseline model to determine if a model threshold is met based on the identified image quality and/or other predetermined criteria. As such, the image capturing device 100, for example, uses the generated model in response to affirmation of the identified image quality. Thus, at block 612, the image capturing device 100 selects a new frame (i.e., image) from the sequence of frames in response to determining the baseline model does not meet the identified image quality. However, in some embodiments, the iterative process of enhancing the baseline model continues for each subsequent frame until the scene change requires establishing a new baseline model.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The

15

16 executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the embodiments disclosed above may be altered or modified and all such variations are considered within the scope of the disclosed subject matter. Accordingly, the protection sought herein is as set forth in the claims below.

What is claimed is:

1. A method implemented by one or more processing units of an image capturing device, the method comprising:

generating a scene model based on a first captured image of a scene, including applying motion analysis to remove moving objects in the first captured image to enhance the scene model; and in response to a threshold scene condition being satisfied, modifying a second captured image of the scene based on the scene model, wherein the second captured image is based on the first captured image of the scene, the modification comprising implementing motion compensation or image registration to align a face region of the second captured image with a face model.

2. The method of claim 1, wherein generating the scene model comprises selecting a first frame from a sequence of frames based on at least one of the first frame being a key frame, the first frame having converged sensor and image signal processor (ISP) settings, or the first frame being manually selected during initialization.

3. The method of claim 1, further comprising:

combining the face region and the scene that are aligned with the face model and the scene model based on at least one of per-pixel blending, temporal averaging, and object merging.

4. The method of claim 1, wherein generating the scene model comprises retrieving a first scene model from a user profile and capturing a second scene model during a video-conferencing event.

5. The method of claim 4, wherein the scene model is based on the first scene model or the second scene model in response to an identified image quality or scene change.

6. The method of claim 5, wherein the first scene model that is stored in the user profile keeps the first scene model in the user profile or is replaced with the second scene model based on the identified image quality or scene change.

7. The method of claim 1, wherein the threshold scene condition is based on at least one of an identified brightness relative to a brightness threshold, an identified contrast relative to a contrast threshold, an identified level of noise and details relative to a noise/detail threshold, and an identified level of image quality or aesthetic analysis relative to an image quality or aesthetic analysis threshold.

8. The method of claim 1, further comprising:

modifying the second captured image comprises modifying the second captured image in response to authenticating a user.

9. The method of claim 1, further comprising:

geometrically aligning the scene model with the second captured image; and enhancing brightness, color, and resolution of the scene model.

10. The method of claim 1, wherein generating the scene model comprises capturing the first captured image including at least one of at least two frames of a sequence of frames and spending time over a time threshold to capture the first captured image.

11. An image capturing device comprising:

one or more processing units, the one or more processing units configured to:

generate a scene model based on a first captured image of a scene, including applying motion analysis to remove moving objects in the first captured image to enhance the scene model; and in response to a threshold scene condition being satisfied, modifying a second captured image of the scene based on the scene model, wherein the second captured image is based on the first captured image of the scene, and wherein modifying the second captured image comprises implementing motion compensation or image registration to align a face region of the second captured image with a face model.

12. The image capturing device of claim 11, wherein the one or more processing units are to generate the scene model by selecting a first frame from a sequence of frames based on at least one of the first frame being a key frame, the first frame having converged sensor and image signal processor (ISP) settings, or the first frame being manually selected during initialization.

13. The image capturing device of claim 11, wherein the one or more processing units are further configured to apply a scene editing based on an identified image quality of the threshold scene condition.

14. The image capturing device of claim 11, wherein the one or more processing units are configured to combine the face region and the scene that are aligned with the face model and the scene model based on at least one of per-pixel blending, temporal averaging, and object merging.

15. The image capturing device of claim 11, wherein the one or more processing units are further configured to determine the threshold scene condition based on at least one of an identified brightness relative to a brightness threshold, an identified contrast relative to a contrast threshold, an identified level of noise and details relative to a noise/detail threshold, or an identified level of image quality or aesthetic analysis relative to an image quality or aesthetic analysis threshold.

16. A method comprising:

generating at least one face model and at least one scene model, by one or more processing units, based on a first captured image of a scene, including applying motion analysis to remove moving objects in the first captured image to enhance the scene model; and in response to an identified lighting threshold being satisfied, modifying, by the one or more processing units, a second captured image of the scene based on at least one of the at least one face model and the at least one scene model, wherein the second captured image is based on the first captured image of the scene and modifying the second captured image comprises implementing motion compensation or image registration to align a face region of the second captured image with the face model.

17. The method of claim 16, wherein the one or more processing units determines modification of the at least one face model based on at least one of artificial intelligence (AI) acceleration, facial landmarks, and edges.

18. The method of claim 16, wherein the one or more processing units modifies the at least one face model for each frame of the second captured image.

19. The method of claim 16, further comprising:

adjusting geometric alignment and photometric alignment of the at least one face model and the at least one scene model prior to modifying the second captured image.

20. The method of claim 16, wherein modifying the second captured image comprises selectively blending at least a portion of the at least one face model with the at least one scene model using at least one of per-pixel blending, temporal averaging, or object merging.

* * * * *